United States Patent [19]

Marshall

[11] 4,175,761

[45] Nov. 27, 1979

[54] COMBINATION LUGGAGE CARRIER AND CART

[76] Inventor: Thomas B. Marshall, 346 Drovers La., Palatine, Ill. 60067

[21] Appl. No.: 848,708

[22] Filed: Nov. 4, 1977

[51] Int. Cl.[2] ............................................. B62B 1/12
[52] U.S. Cl. .................................. 280/47.18; 220/19; 280/47.26; 280/DIG. 3
[58] Field of Search .................. 280/30, 47.18, 47.26, 280/47.28, DIG. 3, DIG. 4; 214/372; 220/19

[56] References Cited

U.S. PATENT DOCUMENTS

| 3,372,829 | 3/1968 | Averill | 220/19 X |
| 3,388,920 | 6/1968 | Hill, Sr. et al. | 280/645 X |
| 3,806,146 | 4/1974 | Shaw | 280/DIG. 3 X |

OTHER PUBLICATIONS

*The European "1000"*, Moffat Wire Products Co., Chicago, Ill. 60612, 2 pages.

*Primary Examiner*—Joseph F. Peters, Jr.
*Assistant Examiner*—Michael Mar
*Attorney, Agent, or Firm*—Hill, Van Santen, Steadman, Chiara & Simpson

[57] ABSTRACT

A luggage carrier is transformed into a cart, such as a shopping cart, by the provision of a knock-down, collapsible basket which is releasably engagable with the carrier and which may be easily assembled for use and disassembled for storage.

16 Claims, 11 Drawing Figures

U.S. Patent  Nov. 27, 1979  Sheet 1 of 3  4,175,761
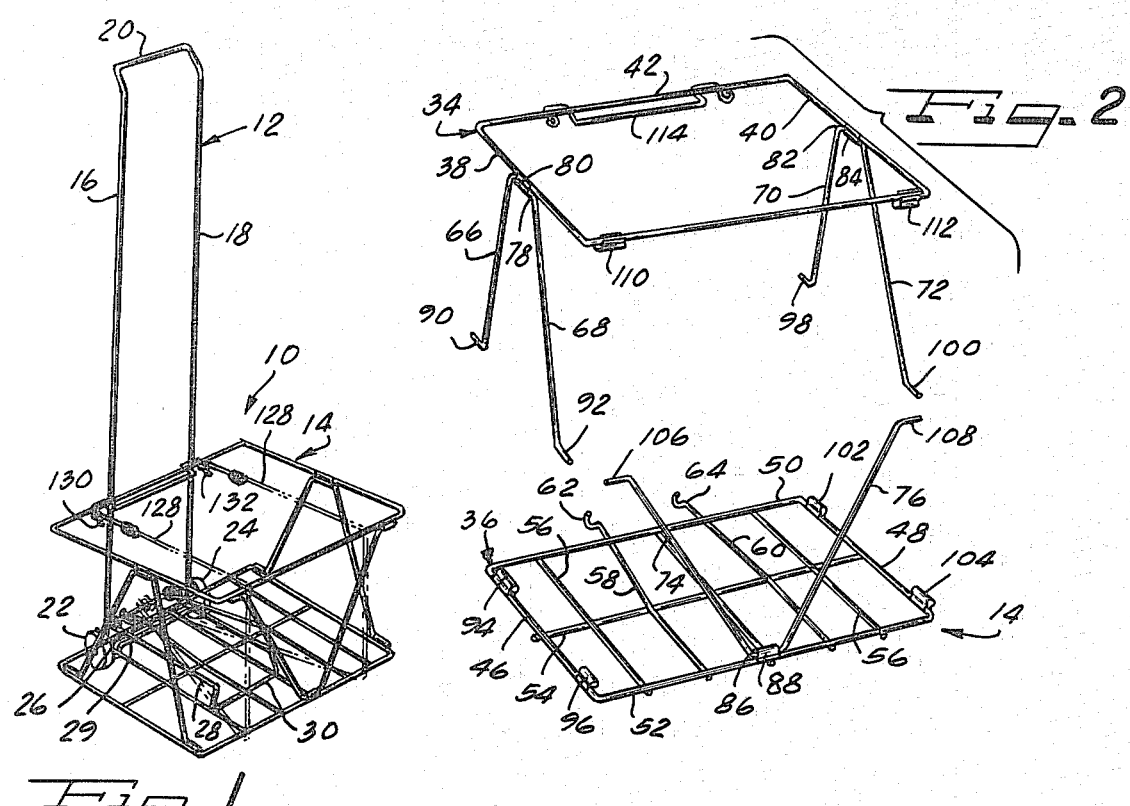
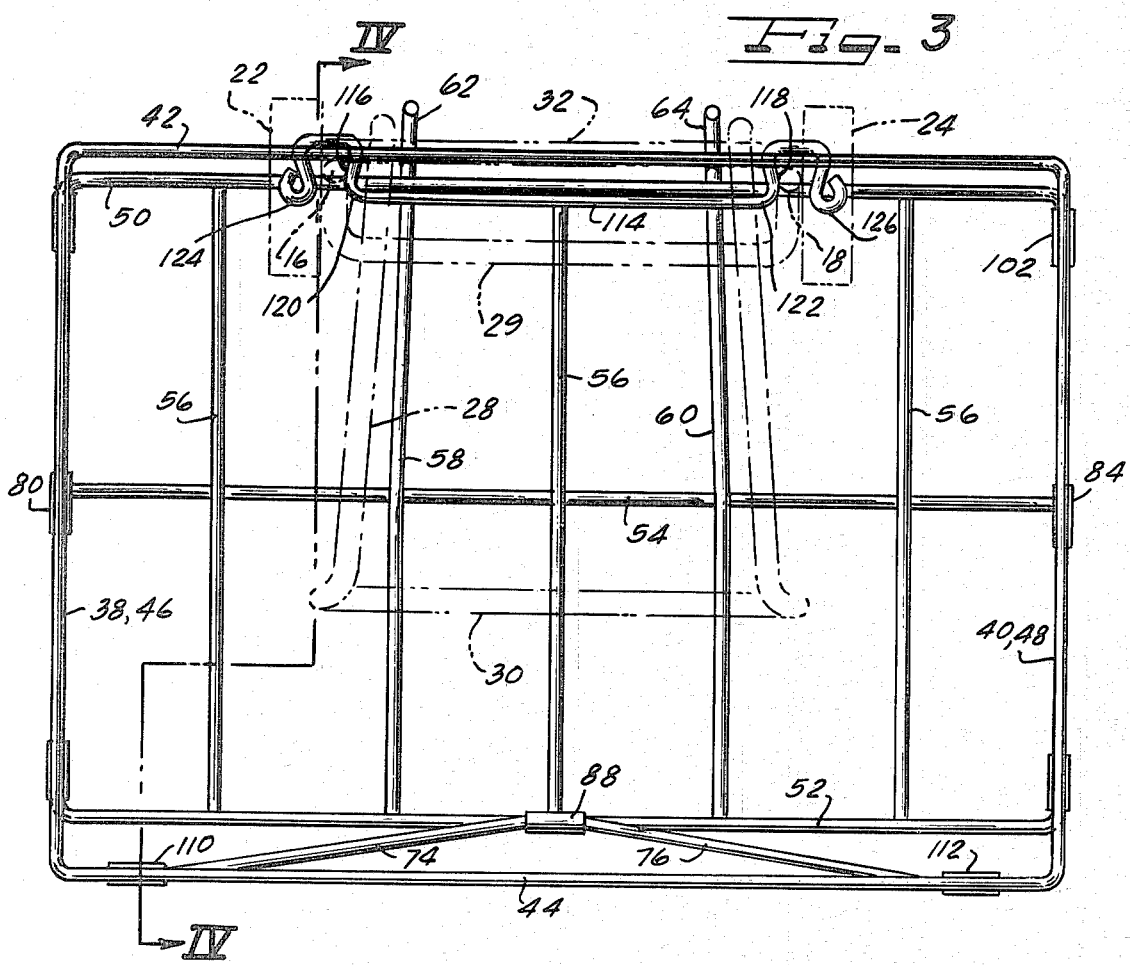

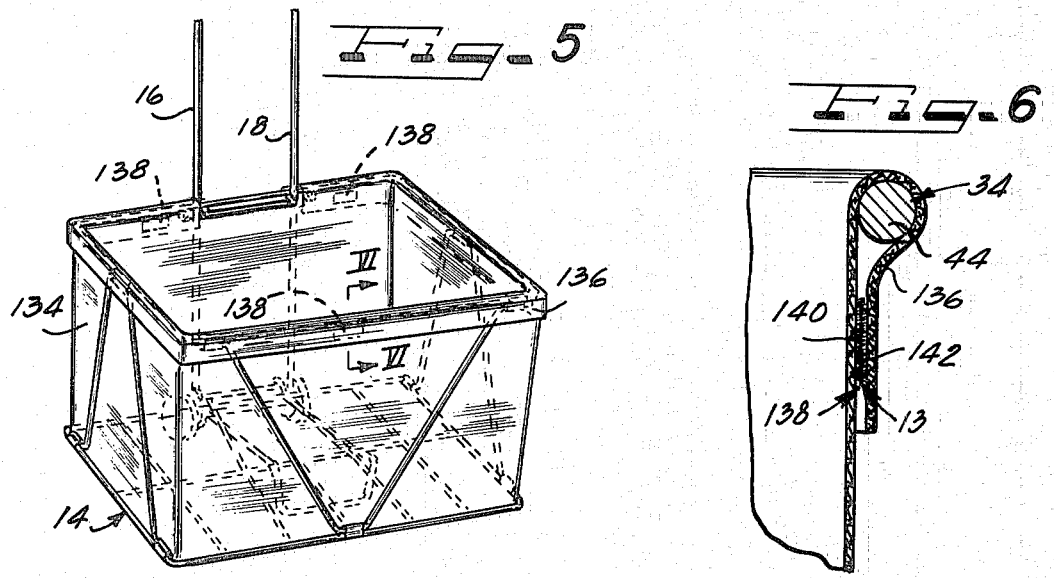
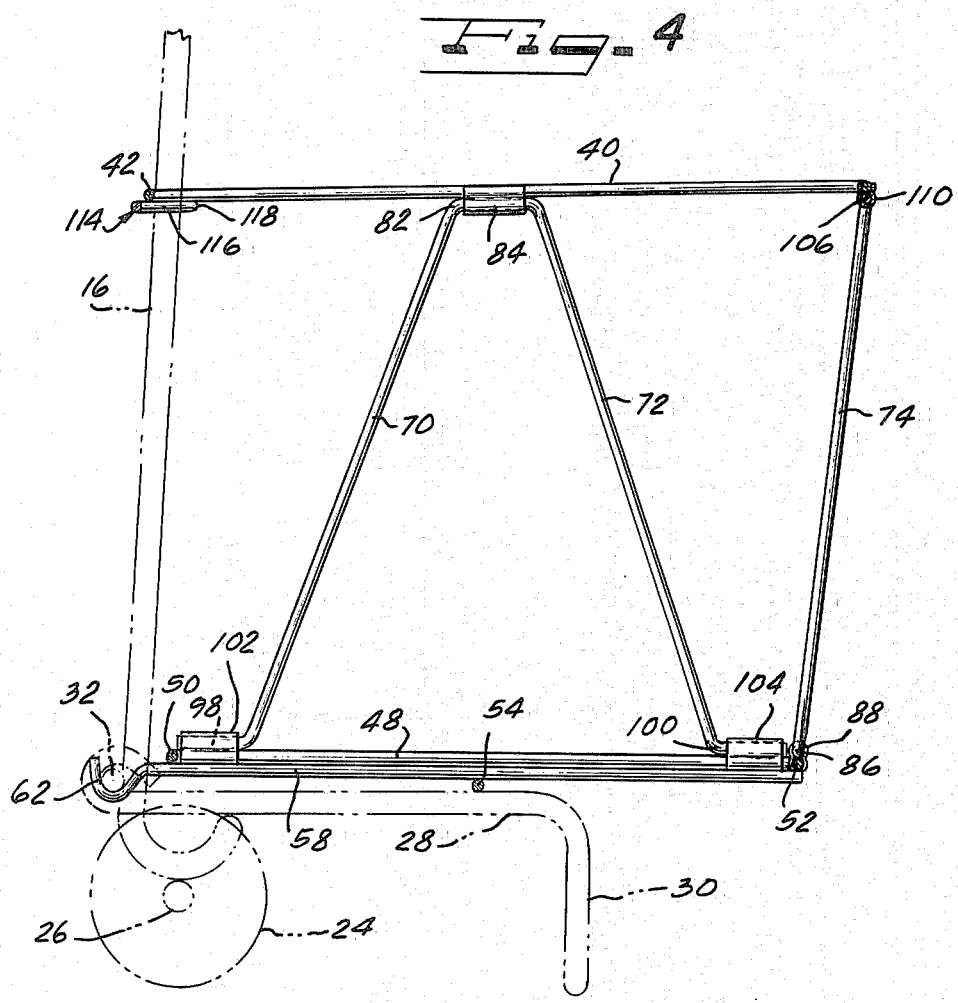

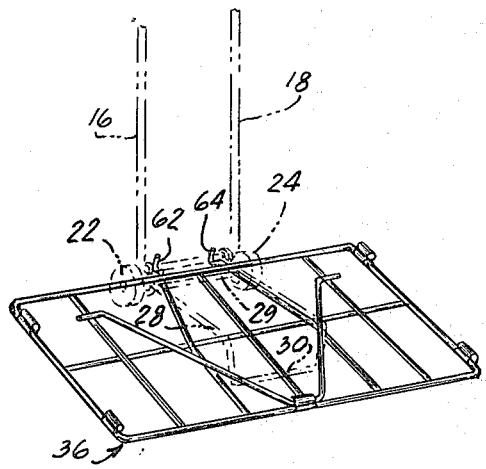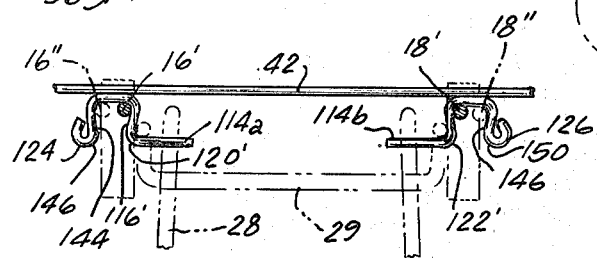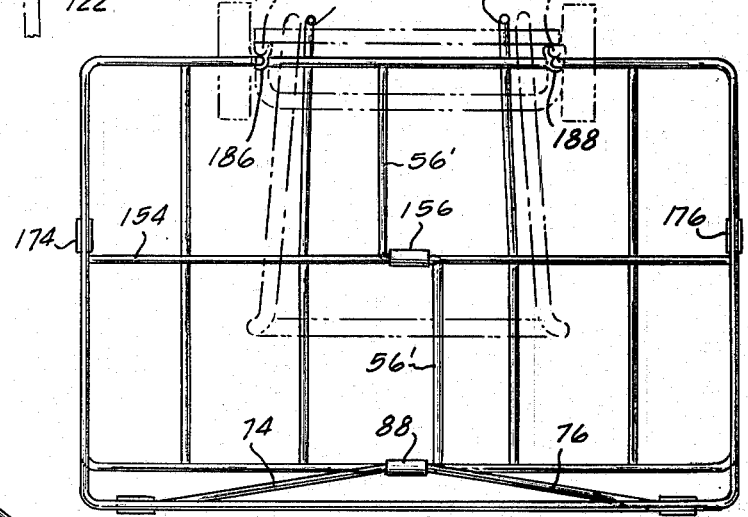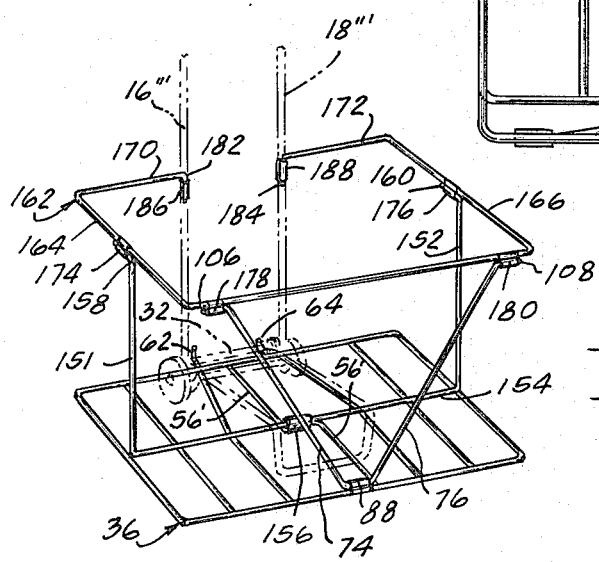

COMBINATION LUGGAGE CARRIER AND CART

BACKGROUND OF THE INVENTION

1. Field of the Invention

This invention relates to hand truck type carriers, and is more particularly concerned with a combination luggage carrier and cart structure which has a removable, knock-down, collapsible basket.

2. Description of the Prior Art

Luggage carriers and shopping carts are well known in the art.

Luggage carriers, for example, two-wheeled structures having an elongate handle and a luggage platform, are widely used by airline personnel for transporting their personnel luggage to and from aircraft. One well-known luggage carrier is THE EUROPEAN "1000", manufactured by Moffat Wire Products Company, 2000 West Fulton St. Chicago, Ill. 60612, which is fully incorporated herein by this reference. This carrier is the same as that illustrated on the drawings, with the exception that the elongate handle structure folds, as does the luggage platform, for compact storage. Similar luggage carriers are also available on the market and primarily comprise a luggage platform, an elongate handle structure, a pair of wheels and an elastic cord to help hold articles and the carrier.

In addition to the shopping carts which are available in supermarkets, personal fold-up shopping carts have been used for many years. These carts are generally in the form of a folding basket which has a pair of wheels at one end and a handle at the other. Some designs of this type of shopping cart provide that the basket fold for compactness.

SUMMARY OF THE INVENTION

The primary object of the present invention is to provide a basket for a luggage carrier which adapts or transforms the luggage carrier into a cart.

Another object of the invention is to provide a basket which is easily engaged and disengaged with a luggage carrier.

Still another object of the invention is to provide a knock-down, collapsible basket for a luggage carrier which is easily assembled and disassembled for use and storage, respectively.

Another object of the invention is to provide a basket which is releasably engagable with luggage carriers of different designs, and which has a design which is easily adapted to most all luggage carriers through a simple dimensional change.

According to the invention, a collapsible basket comprises a lower frame, preferably constructed of heavy gauge wire, and forming the bottom of the basket, an upper open frame, again preferably formed of heavy gauge wire, a folding sidewall structure, also preferably formed of a heavy gauge wire, and an engagement structure for releasable engagement with a luggage carrier.

According to the invention, the basket may also be provided with a liner, such as a canvas material, which has a marginal edge which is foldable over and secured about the open upper frame, so that the basket will accommodate articles which would otherwise pass through the bottom and sidewall structures, assuming the same are of the preferred heavy gauge wire construction.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a perspective view of a luggage carrier and removable basket forming a cart according to the invention;

FIG. 2 is an exploded perspective view of the collapsible basket illustrated in FIG. 1;

FIG. 3 is a top plan view of the basket of FIG. 1, with the pertinent parts of the carrier illustrated primarily in phantom;

FIG. 4 is a sectional view taken substantially along the parting line IV—IV of FIG. 3;

FIG. 5 is a view similar to that of FIG. 1 and illustrating the basket as having a liner;

FIG. 6 is a sectional view taken substantially along the line VI—VI of FIG. 5, showing a fastener for maintaining the liner upright in the basket;

FIG. 7 is a perspective view illustrating the use of the bottom of the basket only for enlarging the luggage platform of the carrier;

FIG. 8 illustrates another embodiment of a portion of the basket-carrier releasable engagement structure;

FIG. 9 is a perspective view similar to that of FIG. 1 illustrating another embodiment of the basket and another embodiment for the releasable engagement means between the basket and the carrier;

FIG. 10 is a left end view of the structure of FIG. 9; and

FIG. 11 is a top plan view of the structure of FIG. 9 with the pertinent portions of carrier illustrated in phantom.

DESCRIPTION OF THE PREFERRED EMBODIMENTS

A combination carrier-cart is generally illustrated at 10 as comprising a carrier 12 and a removable basket 14.

The carrier 12 comprises a pair of elongate rods 16, 18 which are interconnected at one end to form a handle 20, and a pair of wheels 22, 24 which are rotatably carried by an axial 26 which is connected to the lower ends of the rods 16, 18. A luggage platform is pivotally connected at the lower ends of the elongate rods 16, 18 and comprises a pair of forwardly extending members 28 which are joined and folded downwardly to form a support foot 30 and which are supported near the rear ends thereof by a further rod 29. The elongate structure also comprises another rod 32 which, as set forth in detail below, forms a part of the basket attachment structure.

As best illustrated in FIGS. 2-4, the basket comprises an upper frame 34 which is a generally open structure, and a lower frame 36 which forms the bottom of the basket.

The upper frame 34 comprises, in its preferred form, a heavy gauge peripheral wire defining an opening having four sides 38, 40, 42 and 44.

The lower frame 36 also comprises, in its preferred form, a heavy gauge peripheral wire forming a bottom having four sides 46, 48, 50 and 52. The bottom of the basket may be of a grid or grill-work structure including at least one wire 54 extending in a first direction and a plurality of wires 56 extending in a direction perpendicular thereto, the wires 54 and 56 being attached, as by welding, to each other at the intersections thereof and to the four sides 46, 48, 50 and 52 of the peripheral wire. A pair of wires 58 and 60, similar to the wires 56, extend rearwardly of the side 50 and terminate in respective hooks 62 and 64 which are employed, as best illustrated in FIGS. 3 and 4, for hooking beneath the rod 32. As illustrated in FIG. 7, the lower frame 36 may be attached to the carrier 12 by hooking the hooks 62 and 64 beneath the rod 32 and permitting the frame, in particular the wire 54 (see FIG. 4) to rest on the platform of the carrier. When used alone in this manner, the frame 36 essentially expands the carrier platform and provides a larger platform for supporting articles to be transported, such as boxes and the like.

Referring to FIGS. 2 and 4 in particular, the upper frame 34 and the lower frame 36 are provided with means for securing the two frame together in a stabilized manner and to form sidewalls for the basket. For this purpose, a plurality of V-shaped wires are provided in which the point of the V is generally "flat" and the distal ends of the legs of the V are bent outwardly to extend parallel to the flattened point. More specifically, in a first such structure a leg 66 is connected to a leg 68 by a portion 78, the leg 66 includes an outwardly bent portion 90, and the leg 68 includes an outwardly bent portion 92. In the same manner, a second structure is provided in which a leg 70 is joined to a leg 72 by way of an intermediate portion 82, the leg 70 has an outwardly bent portion 98 and the leg 72 has an outwardly bent portion 100. In the same manner, a leg 74 is connected to a leg 78 by way of an intermediate portion 86, the leg 74 includes an outwardly bent portion 106, and the leg 76 includes an outwardly bent portion 108.

Although all three leg structures could be carried by the upper frame 34 or the lower frame 36. With the particular design illustrated in FIG. 2, however, complete compactness is achieved in that the legs attached to the upper frame can be folded therein and the legs attached to the lower frame can be folded on top of that frame and the two frames placed flat against one another for compactness in storage, as will be apparent from the following description.

The legs 66, 68 are pivotally connected to the wire side 38 by means of a tube 80 on the lower side of the peripheral wire which rotatably receives the portion 78 therein. In a similar manner, a tube 84 rotatably receives the portion 82 therein and a tube 88 rotatably receives the portion 86 therein.

As is apparent from FIG. 2, the lower frame 36 carries a plurality of tubes 94, 96, 102 and 104 thereon, while the upper frame 34 carries a pair of tubes 110 and 112 thereon. In assembly, the bent portions 90 and 92 are received in the tubes 94 and 96, the bent portions 98 and 100 are received in the tubes 102 and 104, and the bent portions 106 and 108 are received in the tubes 110 and 112, respectively. During assembly, the legs 66, 68 and the legs 70, 72 and the legs 74, 76 are flexed inwardly of the respective V's so that the bent portions clear the corresponding tubes, after which the legs are permitted to flex outwardly to insert the bent portions within the tubes. In this manner, a more rigid and stable basket structure is provided.

Referring to FIGS. 1-4, the assembled basket 14 is attached to the carrier 12 by placing the handle 20 and the elongate rods 16 and 18 upwardly through the open upper frame 34 so that the lower frame 36 is forward of the rods 16 and 18 and the side 42 of the upper frame 34 is to the rear of the rods 16 and 18. The hooks 62 and 64 of the lower frame are then hooked about the rod 32 and the basket is rotated forwardly and downwardly so that the lower frame 36 rests on the platform 28. The upper frame 34 is then attached to the carrier. For this purpose, the upper frame is provided with a bent wire 114 which is secured to the wire side 42, as by welding. The bent wire 114 comprises a pair of detents 116 and 118 which are spaced apart substantially the same as the spacing between the rods 16 and 18. The detents 116 and 118 have respective noses 120 and 122 which extend inwardly of the basket and which are spaced apart a greater distance than the detents 116 and 118 so as to be in an interference relationship with the respective rods 16 and 18 so that as the basket is rotated forwardly and downwardly, as mentioned above, the noses 120 and 122 engage the respective rods 16 and 18. As additional force is provided to rotate the basket an additional amount with respect to the rods 16 and 18, the rods 16 and 18 slightly flex outwardly to pass the noses 120 and 122 and be received in the detents 116 and 118, respectively.

The bent wire 114 is also provided with a pair of eyelet portions 124 and 126 which have been especially bent about to prevent injury to the hands of a person attaching the basket to the rods 16 and 18. The eyelets 124 and 126 may advantageously be used in conjunction with an elastic cord 128 which has a pair of end hooks 130 and 132 for securing odd-shaped articles within the basket. The cord 128 may be attached to the carrier and extended through any portion of the basket to be stretched about the article with the hooks 130, 132 then being engaged in the eyelets 124 and 126.

As illustrated in FIGS. 5 and 6, the basket 14 may be provided with a liner 134, such as a canvas structure, which has a marginal edge 136 which may be folded about the peripheral wire of the upper frame 34, except possibly at/or between the rods 16 and 18. The liner 134 is provided with a plurality of fasteners 138. As best seen in FIG. 6, a fastener 138 may advantageously be constructed as a two-part fastener including a first part 140 which is secured to the outer surface of the liner 134 and a second part 142, engagable with the part 140, and also secured to the outer surface of the liner 134 on the marginal edge 136. This type of fastener is well known in the art and is sold under the tradename Velcro. With this type of fastener, the two parts 140 and 142 may be sown to the liner 134, or bonded thereto with a suitable bonding agent.

The Moffat Wire Products Company mentioned above also manufactures a line a luggage carriers in which the elongate rods are spaced apart a greater distance than the rods 16 and 18 of the above-identified carrier known as THE EUROPEAN "1000". The basket disclosed herein may also be used for a luggage carrier having a wider spacing of the handle rods, assuming the spacing is as illustrated in FIG. 8, in that the eyelets 124 and 126 are also formed to include respective detents 144 and 146, with respective noses 148 and 150. As with the noses 120 and 122, the noses 148 and 150 are positioned in a yieldable interference relationship with the respective rods 16" and 18" so that the rods and/or the eyelets flex to permit engagement of the rods in the detents.

Referring still to FIG. 8, and particularly provided for those carriers in which a stiffening member is provided between the carrier handle rods, the bent wire 114 of FIGS. 2 and 3 is replaced by a pair of bent wires 114a and 114b. With a gap therebetween, the bent wires 114a and 114b are free to flex so that the rods 16' and 18' may be received in the respective detents 116' and 118' as the noses 120' and 122' are flexed toward each other during attachment of the basket.

Referring to FIGS. 9–11, another embodiment of a collapsible basket and its attachment to a carrier is illustrated. In this embodiment, the carrier includes a pair of rods 116''' and 118''' corresponding to the rods 16 and 18 of FIG. 1. Also, in this embodiment the lower frame 36 is substantially the same as illustrated in FIG. 2, with the exception that, in addition to the legs 74, 76 which are pivotally attached at 88, the lower frame 36 also includes one or more bent wires 56' which form a part of the bottom of the basket, and an additional pivotal leg structure including a first leg 151 and a second leg 152 which are connected together by a portion 154 which is pivotally received in and connected to the frame 36 by a tube 156. The leg 151 includes a portion 158 which is bent to extend at right angles to the leg 151 and to the intermediate portion 154, while the leg 152 includes a portion 160 which is bent to extend at right angles to the leg 152 and to the intermediate portion 154.

The basket also includes an upper frame 162 which includes a peripheral wire bent to form an opening for the basket and to define a side 164, a side 166, a side 168 and a pair of partial sides 170 and 172. The side 164 carries a tube 174 for receiving the leg portion 158 therein, the side 166 carries a tube 176 for receiving the leg portion 160 therein, and the side 168 carries a tube 178 and a tube 180 for receiving the leg portions 106 and 108, respectively, therein.

The basket is assembled in a manner similar to that discussed above for the basket illustrated in FIGS. 1–4. In attaching the basket to the cart, the lower frame 36 has its hooks 62 and 64 hooked about the rod 32 in the same manner as previously discussed. In this embodiment, however, the peripheral wire of the upper frame includes a pair of downwardly bent portions 182 and 184 which are received in respective tubes 186 and 188 carried by the rods 16''' and 18''', respectively.

The basket illustrated in FIGS. 9–11 may also utilize the liner 134 of FIGS. 5 and 6, or another liner which is similarly constructed.

It is readily apparent that many modifications can be made. For example, the engagement between the basket and the rods 16 and 18 may be provided by a strap or straps, or by a "safety-pin" mechanism carried by the basket in place of the bent wire 114 or the bent wires 114a and 114b.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A collapsible basket for a hand truck type wheeled carrier, comprising:
   a generally flat open, rectangular upper frame including a pair of first sides and a pair of second sides;
   a generally flat, closed, bottom frame forming the bottom of the basket and including a pair of first sides and a pair of second sides;
   said means pivotally connected to at least one of said frames and releasably connectible to the other of said frames and extending from said first sides of said upper frame to said first sides of said bottom frame and from at least one of said second sides of said upper frame to the corresponding side of said bottom frame to form sides for the basket; and
   connecting means for connecting said basket to the carrier,
   said upper frame including a wire bent to form said first and second sides,
   said bottom frame including a plurality of wires and a peripheral wire connected to said plurality of wires and defining said first and second sides, and
   said side means including pivotally-mounted wires,
   each of said pivotally-mounted wires including a resilient generally V-shaped structure with a first portion oblique to the legs of the V at the intersection of the legs giving a flattened V appearance, and second portions at the distal ends of the legs of the V extending parallel to said first portion,
   the respective frame including a first tube about said first wire portion forming the pivot therefor, and
   the respective other frame including, for each V-shaped wire structure, a pair of second tubes, spaced apart less than the spacing of, and for receiving said second portions so that the V-shaped structures must be flexed to move the legs toward each other to permit engagement of said second portions and said second tubes under the bias of the resiliency of the wire structure.

2. The basket of claim 1, comprising:
   a bag-shaped liner shaped corresponding to the shape of said basket and including a bottom wall, side walls and a marginal edge at the bag opening which may be folded over said upper frame, and securing means for releasably securing said marginal edge about said upper frame.

3. A combination luggage carrier and basket type cart, comprising:
   an elongate structure including first and second ends and a handle at said first end;
   a pair of wheels rotatably mounted spaced apart at said second end;
   platform means mounted at said second end for carrying luggage;
   a detachable, collapsible basket to be supported by said elongate structure and said platform, said basket comprising
      a generally flat, open upper frame defining an opening for ingress and egress of the basket,
      a generally flat bottom frame including means defining a support for articles to be carried in the basket,
      side means defining the sides of the basket and including a plurality of stabilizing members each of which is pivotally attached to one of said frames and releasably engagable with the other of said frames; and
   connecting means for releasably connecting said basket to said carrier.

4. The basket of claim 3, wherein:
   each of said stabilizing members and the other frame to which it is connectible comprise means for releasably connecting such elements at at least two points.

5. The combination of claim 3, comprising:
   a basket liner including a marginal edge to be folded over said upper frame; and fastening means for securing said marginal edge about said upper frame.

6. The combination of claim 3, wherein:
said upper frame includes a peripheral wire defining the opening, the elongate structure being received within the opening so as to be within said basket at least in the upper portion thereof; and
said connecting means includes first means carried by said elongate structure and second means carried by said basket and engagable with said first means.

7. The combination of claim 3, wherein:
said carrier comprises at least one elastic strand including a hook at one end thereof; and
said basket includes an eyelet engagable by said hook, whereby a load in said basket may be secured by wrapping the same with said elastic in a stretched condition and engaging said hook in said eyelet.

8. The combination of claim 3, wherein said connecting means comprises:
first means mounted on said carrier and second means mounted on said basket for releasable engagement with said first means.

9. The combination of claim 8, wherein:
said first means comprises tubular means mounted on said elongate structure; and
said second means includes downwardly extending projections carried by said basket to be received by said tubular means of said elongate structure.

10. The combination of claim 8, wherein:
said first means comprises a member carried by said elongate structure generally parallel to the axis of rotation of said wheels; and
said second means comprises hook means extending from said basket to hook about said member.

11. The combination of claim 8, wherein:
said first means includes a pair of first spaced members carried by said elongate structure; and
said second means includes a pair of second spaced members which are in an interference relationship to said first spaced members as said first and second means are moved toward each other to mount said basket, one of said pairs of spaced members being yieldable to flex under the application of a force with respect to the interference relationship to permit said first and second members to pass each other and then restore to their original positions.

12. The combination of claim 11, wherein:
said first spaced members comprises a pair of rods oriented vertically when said carrier is standing in an up-right position; and
said second spaced members are each wire elements shaped to have a detent portion for receiving a respective one of said rods.

13. The combination of claim 12, wherein:
said second members include outwardly opening detents for receiving respective ones of said rods.

14. The combination of claim 12, wherein:
said second members include inwardly opening detents for receiving respective ones of said rods.

15. A combination luggage carrier and basket type cart, comprising:
an elongate structure including first and second ends and a handle at said first end;
a pair of wheels rotatably mounted spaced apart at said second end;
platform means mounted at said second end for carrying luggage;
a detachable, collapsible basket to be supported by said elongate structure and said platform, said basket comprising
a generally flat, open upper frame defining an opening for ingress and egress of the basket,
a generally flat bottom frame including means defining a support for articles to be carried in the basket,
side means defining the sides of the basket and including folding side members attached to each of said frames; and
connecting means for releasably connecting said basket to said carrier.

16. The combination of claim 15, wherein said connecting means comprises:
first means on said upper frame for engaging one portion of said elongate structure; and
second means on said bottom frame for engaging another portion of said elongate structure.

* * * * *